Patented June 15, 1937

2,084,203

UNITED STATES PATENT OFFICE 2,084,203

ARTIFICIAL RESIN

Earle C. Kneale and Henry H. Wohlgemuth, Pontiac, Mich.

No Drawing. Application November 18, 1931, Serial No. 575,960. Renewed August 1, 1935

7 Claims. (Cl. 260—4)

This invention relates to resinous bodies and to a process for producing the same, an object of the invention being to produce artificial resins of relatively high molecular weight having improved characteristics and properties, such resins being useful in the manufacture of varnishes, plastic and molding compositions, and for a variety of other purposes.

The invention, according to one aspect thereof, contemplates producing a resin complex by the reaction of a natural resin of acidic character, such as colophony for example, with a condensation product of a phenolic body and formaldehyde in the presence of a polyhydric alcohol under conditions capable of producing a new and useful composition from these substances.

The invention also contemplates the production of a resin complex by the reaction of a liquid partial phenol-formaldehyde condensate with a neutral or acidic resin body in the presence of an agent effective to prevent substantial further independent condensation reaction of the condensate to the extent of solidifying at the relatively high temperature of the reaction.

We are aware that suggestions have been made to combine phenol-aldehyde resins with natural resins to produce nearly neutral resins. According to these suggestions a fusible phenol formaldehyde condensation product is produced, as by alkaline condensation, then melted and united with colophony, and the resultant gum is thereafter esterified with a polyhydric alcohol so as to render it nearly neutral; or the condensation product is melted with colophony previously esterified with the gylcerin.

The phenol formaldehyde condensation products thus employed are generally intermediate condensates in solid form which may be melted at sufficiently high temperatures for combination with melted colophony or other resin, but which if subjected to prolonged heat may be converted into hard heat resistant insoluble and infusible masses known as resites or final condensates. The nature of this transformation is presumed to be a polymerization process. One of the principal difficulties in combining successfully a phenol-aldehyde resin with a natural resin is due to the tendency of the condensation product to be converted partially or wholly into infusible masses in which state reaction with the natural resin does not take place.

In previous processes it has been necessary to resort to a sequence of separate steps which we have found to be undesirable, and in fact when eliminated enable us to produce a gum of greater value particularly in the manufacture of rapid drying varnishes for automobile bodies, which varnishes are highly resistant to weather and also to cracking or chipping as a result of stresses, strains and blows.

We have discovered that a resin complex of new properties may be produced by employing a partial condensate of phenol-aldehyde which is in an initial stage of reaction and in the form of a liquid. Although this liquid partial condensate is highly unstable and by the application of heat may be converted into infusible, solid masses, we have found that the liquid condensate may be combined under certain conditions with a resin, such as melted colophony, at relatively high temperatures without converting the condensate into infusible solids. This we have found possible particularly by conducting the reaction simultaneously in the presence of an agent, preferably a polyhydric alcohol.

In accordance with the present invention it is preferred to employ a liquid partial condensate, although the condensation reaction may be carried further. In preparing the condensate any suitable phenolic body may be used, such as commerical cresol containing the mixed isomers, ortho, meta, and para cresols, or the meta para fractionation, and a forty per cent aqueous solution of formaldehyde is preferred although derivatives of formaldehyde may be employed, as desired.

An illustration of a way in which the invention may be carried out is as follows:

Twenty-five to fifty parts by weight of formaldehyde and twenty-five to fifty parts by weight of cresol are mixed in a suitable receptacle and allowed to stand over a period of a number of days, such as ten. The reaction is accelerated by adding between two and five parts of an aqueous solution of sodium hydroxide to the mixture in small amounts over this period, maintaining the temperature of the mixture at about room temperature or slightly above. Thereafter the solution is neutralized with an aqueous solution of hydrochloric acid or acetic acid, and the top liquor (about 25%) then dra.~?d off. To the remaining solution may be added from twenty-five to sixty-five parts of glycerine, and this liquid is slowly introduced under pressure into from two hundred to five hundred parts of melted natural or neutral resin in a closed vessel at a temperature preferably between 160° and 190° C. The reaction may then be continued by further heating to a temperature between 215° and 280° C., after which the material can be drawn into containers to cool. The resulting gum will have an acid number between 112 and 120 or between 12 and 18 depending upon the time of heating and the quantity of glycerine and natural or neutral resin used. The gum also has a melting point between 65 and 70 or between 110 and 140 depending upon the time of heating and the amounts of condensate and natural or neutral resin used.

The acid number and melting point of the gum made according to the above example will of course vary depending upon the relative proportions of glycerine, colophony, and formaldehyde, and also upon the length of time in which the heating is conducted as well as the temperature. For instance the acid number is lowered either by (1) increasing the amount of glycerine or the length of time of heating or both, or (2) decreasing the amount of colophony while maintaining the amount of glycerine constant. Also, the melting point may be raised either by (1) increasing the amount of condensate or the length of time of heating or both, or (2) decreasing the amount of colophony while maintaining the amount of condensate constant. Consequently, in the example given herein to illustrate one way of carrying out the invention, a partially neutral gum could be produced with an acid number between 112 and 120 or a substantially neutral gum with an acid number between 12 and 18.

For example, utilizing the above process, a gum having an acid number between 112 and 120 and a melting point between 65° C. and 70° C. may be produced with approximately twenty-five parts of cresol, twenty-five parts of formaldehyde, sixty-two and one-half parts of glycerine, and five hundred parts of colophony.

As a further example, utilizing the above process, a gum having an acid number between 12 and 18 and a melting point about 110° C. may be produced with approximately twenty-five parts of cresol, twenty-five parts of formaldehyde, twenty-five parts of glycerine and two hundred parts of colophony. The melting point can be increased to about 140° C. by about doubling the above quantities of cresol and formaldehyde.

It will thus be understood that the proportions and relative amounts of the ingredients may be varied and that the above temperature ranges are merely suggestive. Moreover, it will be understood that the glycerine may be introduced simultaneously with the colophony, or if desired the resin may be reacted with the condensate in the presence of a polyhydric alcohol and then additional alcohol introduced into the reaction mass. It is important, however, that the reaction of the phenol-aldehyde liquid condensate with melted natural resin at relatively high temperature be conducted in the presence of a polyhydric alcohol. The latter acts not only as a vehicle or agent effective to prevent solidifying either of the resin or the condensate but also functions to esterify the resin acid.

Although in the preferred example colophony has been indicated as a natural resin which may be employed with satisfactory results, it is understood that other suitable natural resins of acidic character may be used, such as the copals or fossil resins, or combinations of such natural resins. Where, however, it is desired to use a neutral resin, such as a coumarone-indene resin in place of a natural resin, the polyhydric alcohol or glycerine, which is present during the reaction with the liquid partial condensate, does not function to esterify the resin since it is already neutral, but on the other hand functions to prevent solidifying of the phenol-formaldehyde condensate as above described.

In explaining in detail the present invention it is understood that the phraseology or terminology herein employed is for the purpose of description and not of limitation, that known equivalents of ingredients herein specified may be substituted, and that the invention is not expressly limited by the terms of the claims except as construed in view of the prior art.

It will be understood that the proportions and relative amounts of the ingredients and the above temperatures may be varied without departing from the spirit of the invention, the foregoing examples being suggestive, but not exclusive, of ways in which the process may be carried out to produce satisfactory results.

We claim:

1. The process of producing a resinous body having an acid number of between 112 and 120 and a melting point of between 65° and 70° C., the process comprising admixing about twenty-five parts by weight of cresol with about twenty-five parts by weight of formaldehyde, reacting the masses in the presence of an alkaline condensation agent to produce a liquid partial condensate, thereafter adding approximately sixty-two and five tenths parts by weight of glycerine to the produced liquid partial condensate, providing about five hundred parts by weight of colophony heated to a temperature of between 160° and 190° C., thereafter slowly introducing the admixed liquid partial condensate and glycerine into the heated colophony, and thereafter heating the admixed masses to temperatures of between 215° and 280° C. until the reaction is completed.

2. The process of producing a resinous body having an acid number of between 12 and 18 and a melting point of 110° C., the process comprising admixing about twenty-five parts by weight of cresol with about twenty-five parts by weight of formaldehyde, reacting the masses in the presence of an alkaline condensation agent to produce a liquid partial condensate, thereafter adding approximately twenty-five parts by weight of glycerine to the produced liquid partial condensate, providing about two hundred parts by weight of colophony heated to a temperature of between 160° and 190° C., thereafter slowly introducing the admixed liquid partial condensate and glycerine into the heated colophony, and thereafter heating the admixed masses to temperatures of between 215° and 280° C. until the reaction is completed.

3. A process for the production of a resinous body which comprises admixing glycerine with a liquid partial condensate of phenol and formaldehyde in such proportions as to prevent substantial further condensation thereof, adding the admixed mass to melted colophony maintained at a temperature of between 160° and 190° C., and thereafter heating the resultant admixture to temperatures of between 215° and 280° C. until the reaction is completed.

4. The process of producing a rapid drying varnish resin imparting high resistance to the deterioration of the varnish film by weather, cracking or chipping, the process comprising providing a suitable quantity of an unstable liquid partial condensate obtained from the alkaline partial condensation of phenol and formaldehyde, adding thereto a suitable quantity of a natural acid resin and a polyhydric alcohol at temperatures of between 160° and 190° C., and thereafter heating the admixed masses to temperatures of between 215° and 280° C. until the reaction is completed.

5. A single step reaction process producing a resinous body which comprises providing a suitable quantity of a liquid partial condensate resulting from the alkaline condensation of approximately equal parts by weight of phenol and formaldehyde, admixing with such condensate a natural resin and glycerine at temperatures of between 160° and 190° C., and thereafter completing the reaction at temperatures in excess of 190° C.

6. The process of producing a resinous body adapted to impart high resistance to weathering, cracking or chipping of a varnish film, and comprising a single step reaction in which a mixed solution of a liquid partial condensation product of phenol and formaldehyde and glycerine is added to a quantity of melted natural resin maintained at temperatures of between 160° and 190° C., and thereafter raising the temperature of the admixed masses to between 215° C. and 280° C. until the reaction is completed.

7. A single step reaction process producing a resinous body which comprises providing a suitable quantity of a liquid partial condensate resulting from the alkaline condensation of approximately equal parts by weight of phenol and formaldehyde, admixing with such condensate a natural resin and glycerine at reactive temperatures below approximately 190° C., and thereafter completing the reaction at temperatures in excess of 190° C.

EARLE C. KNEALE.
HENRY H. WOHLGEMUTH.